United States Patent [19]

Bishop

[11] Patent Number: 5,128,664
[45] Date of Patent: Jul. 7, 1992

[54] SEARCH TECHNIQUE FOR IDENTIFYING SLAVE DEVICES CONNECTED TO A SERIAL BUS

[75] Inventor: Thomas S. Bishop, Woodland Park, Colo.

[73] Assignee: Ampex Corporation, Redwood City, Calif.

[21] Appl. No.: 836,676

[22] Filed: Mar. 5, 1986

[51] Int. Cl.⁵ .............................................. H04Q 9/00
[52] U.S. Cl. ......................... 340/825.07; 340/825.08; 340/825.52
[58] Field of Search ...................... 340/825.07, 825.08, 340/825.52, 825.5, 825.22; 370/16, 13, 55

[56] References Cited

U.S. PATENT DOCUMENTS

| | | | |
|---|---|---|---|
| 3,427,587 | 2/1969 | Carlson et al. | 340/147 |
| 3,427,588 | 2/1969 | Mauzey et al. | 340/147 |
| 3,427,589 | 2/1969 | Robinson | 340/147 |
| 4,100,533 | 7/1978 | Napolitano et al. | 340/147 R |
| 4,546,467 | 10/1985 | Yamamoto et al. | 370/13 |
| 4,574,283 | 3/1986 | Ararawa et al. | 340/825.08 |
| 4,595,921 | 6/1986 | Wang et al. | 340/825.5 |
| 4,596,983 | 6/1986 | Sjogren et al. | 340/825.52 |
| 4,598,399 | 7/1986 | Bath | 370/55 |
| 4,683,531 | 7/1987 | Kelch et al. | 340/825.22 |

FOREIGN PATENT DOCUMENTS

| | | |
|---|---|---|
| 12502 | 6/1980 | European Pat. Off. |
| 53-117904 | 10/1978 | Japan . |
| 56-40345 | 4/1981 | Japan . |
| 56-52949 | 5/1981 | Japan . |

OTHER PUBLICATIONS

Smith, IBM Tech. Discl. Bull., vol. 7, No. 12, p. 1127, "Terminal Polling From a Delay Line Buffer".

*Primary Examiner*—Donald J. Yusko
*Assistant Examiner*—Michael Horabik
*Attorney, Agent, or Firm*—James LaBarre; George B. Almeida

[57] ABSTRACT

A slave device detecting system utilizes the past history of devices connected to a data bus to optimize the time required to re-establish communications. Whenever a master controller senses a condition that requires an assessment of devices on the bus, it examines the addresses of previously connected devices at more frequent time intervals than it does for addresses that were not previously associated with connected devices. In a preferred approach, all valid addresses can be examined in a sequential fashion, and the address of the previously connected device can be examined at every fifth or tenth position in the sequence. With such a technique, a device will be detected much faster once it has returned to the bus.

20 Claims, 2 Drawing Sheets

SEARCH TECHNIQUE FOR IDENTIFYING SLAVE DEVICES CONNECTED TO A SERIAL BUS

BACKGROUND OF THE INVENTION

The present invention relates generally to data communication systems, and more specifically to the identification by a master controller of all slave devices that are operatively connected to the controller via a data bus.

Various data communication systems exist in which a master unit selectively communicates with subsidiary units by means of a data bus. One example of such a system can be found in a video production studio, in which a master controller, such as an edit controller, can have one or more slave recorders connected to it at any particular time by means of a SMPTE serial bus. Among other functions, the master controller operates to control the speed and direction of movement of the tape drives in each of the various recorders that are connected to it so that all of the recorders can run in synchronism.

In accordance with established standards, each instruction which the master controller sends to a slave device in this type of system must be preceded by a unique address assigned to that device. More particularly, each communication between the master controller and the slave device is initiated by sending the slave's address. Until the slave detects a message that begins with its address, it does not respond to the master or otherwise put information on the bus. Furthermore, once a communication has been initiated, the address is not re-sent until the communication is terminated.

Since the number and types of slave devices that are connected to the bus can vary from one job to the next, and might even change during a particular session, the master controller must initially ascertain the address of each slave device that is connected to it when the system is activated. To do so, the master controller sequentially sends messages containing each valid address that can exist for the system, and detects when a message is acknowledged by a slave device having that address. Once the slave devices have been so identified, the master controller can then transmit the proper command signals on the bus to control a desired slave device.

One type of problem that is frequently encountered in this type of system involves a loss of connection between the master controller and a slave device. This loss of connection might be caused by such events as removing the cable which connects the slave device to the bus, any temporary bus error, or a loss of power to the slave device, for example. When the master controller senses that it has lost connection to one of the slave devices, it should attempt to re-establish communication with the device.

In the past, the procedure that has been followed to redetect a slave device has been the same as that which is employed when the system is first activated, i.e. the sequential examination of all valid addresses for the system. It will be appreciated that this approach can consume a significant amount of the controller's operating time. For example, in a video tape recording system that is limited to about 45-50 valid addresses, it can take up to 15 seconds to detect a slave device with whom connection was lost. Many systems have a greater number of addresses that need to be examined, and therefore require a proportionately greater amount of time to re-establish communication. For example, it is possible to have 8176 valid addresses in any system which complies with the SMPTE standards.

Accordingly, it is desirable to provide a different technique which enables communication with a slave device to be re-established in a shorter period of time once the master controller senses a condition that indicates a need to ascertain which slave devices are present on the bus, e.g. lost connection with a device or failure to communicate with a device for a period of time. One approach might be to first re-examine the address of the suspect device once the controller senses the condition. However, this technique is not always successful because a device frequently does not return to the bus within one examination cycle after an error is sensed. If this is the case, the controller will examine all of the other addresses before it returns to that of the suspect device. Thus, it will be appreciated that this approach could end up taking longer to reestablish communications in many situations.

It is therefore an object of the present invention to provide a novel system for re-detecting a slave device so that communication with a device can be re-established in a minimal amount of time. Along these lines, it is also an object of the invention to provide such a system that complies with all established requirements relating to the detection of devices connected to a bus.

BRIEF STATEMENT OF THE INVENTION

In accordance with these objectives, the present invention embodies a slave device detecting system in which the past history of devices connected to the bus is used to optimize the time required to re-establish communications. Whenever communication is lost between a master controller and a slave device, or some other condition arises which requires an assessment of devices on the bus, the most likely occurrence is that the same slave device will have returned to the bus. Therefore, when the master controller senses that one of these conditions is present, it examines the address of the suspect device at more frequent time intervals than it does for addresses that were not previously associated with connected devices. If more than one slave device was connected to the bus prior to a loss of communication, for example, the address of each of the previously connected devices can be examined at the more frequent rate. In a preferred approach, all valid addresses can be examined in a sequential fashion, and the address of the previously connected device can be examined at every fifth or tenth position in the sequence. With such a technique, a device will be detected much faster once it has returned to the bus.

DESCRIPTION OF THE ILLUSTRATED EMBODIMENTS

In the following description of preferred embodiments of the invention, particular reference is made to the incorporation of the invention in a system for controlling video tape recorders. This reference is made to facilitate an understanding of the invention and its possible applications. It will be appreciated, however, that the invention can be embodied in a variety of different data communication systems and the description is therefore not intended to be a limitation on the scope of the invention.

Figure 1:
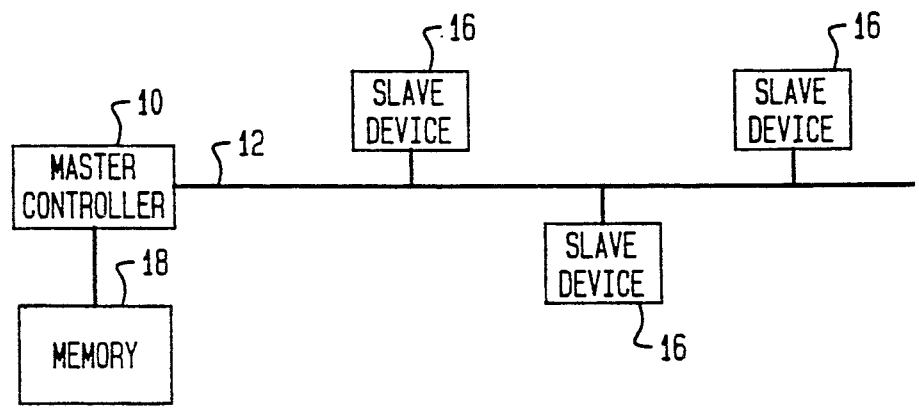
FIG. 1 is a general block diagram of a data communication network that can employ the detection system of the present invention.

Referring now to FIG. 1, the general layout of a data communication system that can employ the concepts of the present invention is illustrated in block diagram form. A primary component of the system is a master controller 10, which has a data bus 12 connected to it for communication with other devices. For example, if the data communication system is part of a video tape recorder network, the master controller 10 could be an edit controller. One or more slave devices 16, e.g. video and/or audio tape recording and reproducing units, are connected to the bus.

The present invention is applicable to data communication systems of this type wherein the slave devices are selectively connected to the bus, i.e. they can be readily connected or removed in accordance with any desired system configuration. For example, the production of one type of video program may only necessitate the connection of a single slave recorder to the bus in order to enable the program to fade from one recorded scene to another. However, production of another program may require several different types of slave recorders to be connected to the bus to facilitate the complex integration of many different recorded elements.

Due to the selective connection of slave devices in such a system, the master controller must take an "inventory" of all slave devices that are connected to the serial bus each time the controller is activated, and possibly from time to time thereafter if new devices are added during a session. As noted above, this is accomplished by sequentially examining each valid address that can exist for the system to determine if a device is present at that address. Each time that a device responds to a message transmitted to its unique address, the master controller 10 identifies the device address in an associated memory unit 18. For example, the controller may cause the memory unit 18 to store only the addresses of the devices which respond to the inquiry. Alternatively, the memory unit could comprise a table containing all valid addresses, and the controller can cause a flag to be placed next to each address which corresponds to a device that is connected to the bus.

After the identity of each slave device is stored in the memory unit, the controller carries out its normal operations. Each time that a communication is initiated with one of the devices 16, the message is provided with a prefix composed of the address for that device, in accordance with established standards.

Figure 2:
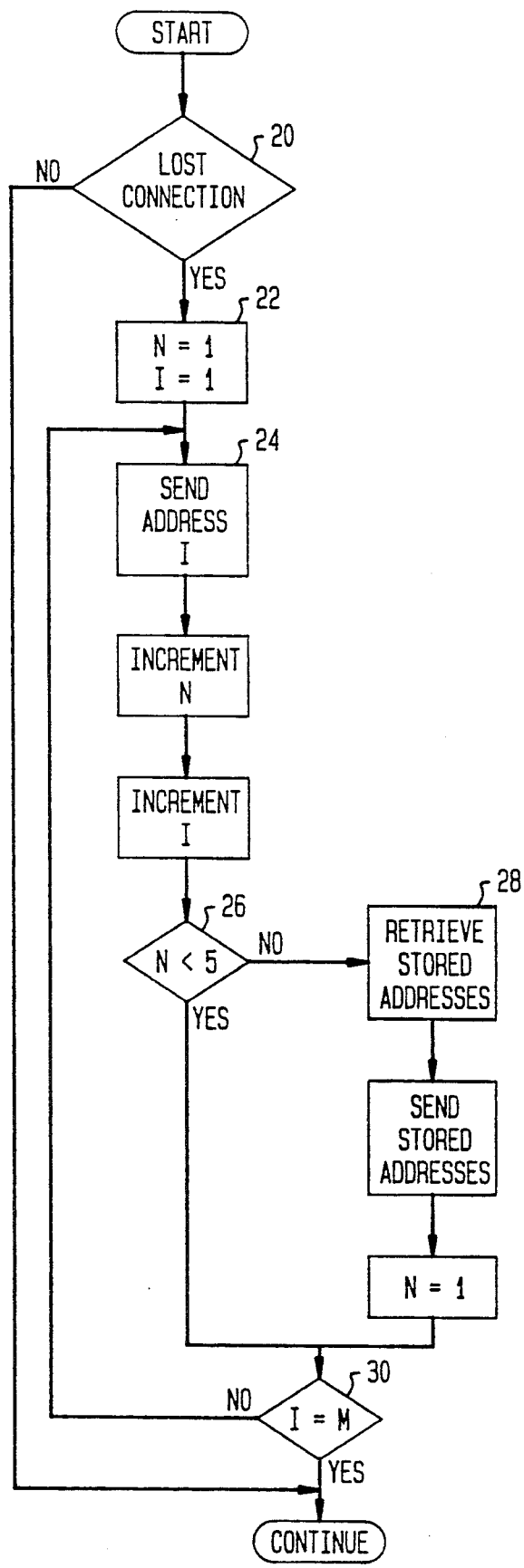
FIG. 2 is a flow chart of a program for detecting the presence of slave devices after communication with a master controller has been interrupted.

When the master controller 10 senses that connection with one of the slave devices is lost, it must ascertain whether the connection to that device is subsequently re-established. Referring to FIG. 2, a procedure for quickly detecting the slave device in accordance with the present invention is shown in flow chart form. Once the master controller 10 senses that connection with one of the slave devices has been lost, or otherwise detects that an error which could result in a lost connection has occurred (block 20), an address pointer I and an index N are set to initial values (block 22). The master controller then sends a message to the first address and determines whether a response is received from that address (block 24). The pointer I and the index N are incremented, and the master controller continues to send the message to each address in sequence for a predetermined number of times. This number is arbitrarily chosen, and in the illustrated example this number is five.

When the index N indicates that the message has been sent to five consecutive addresses (block 26), the sequence is interrupted and the master controller 10 retrieves from the memory unit 18 the addresses of the slave devices that were previously connected to the bus (block 28). The message is then sent to each of the retrieved addresses, and the index is reset to its initial value. If all of the lost slave devices have returned to the bus and been detected at this point, the search process can stop here. However, if at least one of the devices does not respond, the examination procedure returns to the next address in the original sequence and sends messages to the next five consecutive addresses. Then, the addresses stored in the memory are again examined.

The process proceeds in this manner, with the addresses of the previously connected devices being examined at every sixth position in the examination sequence. This continues until the address pointer is equal to the total number M of valid addresses. At this point, each valid address has been examined at least once, but the addresses of the previously connected devices, which are the ones most likely to be reconnected to the bus, have been examined more frequently. For example, if it is assumed that two devices having addresses 372 and 645 were connected to the bus before an error was sensed, the address sequence would appear as follows: 001, 002, 003, 004, 005, 372, 645, 006, 007, 008, 009, 010, 372, 645, 011, 012 etc. Thus, once the lost slave device is reconnected to the bus it is likely to be detected much more quickly than by a simple examination scheme in which all valid addresses are examined in sequential order. Accordingly, communications between the master controller and the slave device can be re-established in less time, so that control of the slave device can resume in a more efficient manner.

In the above example, the address of each of the previously connected devices is examined at the more frequent rate. However, if it is possible to detect that only one of the previously connected devices (e.g. device 372) has been lost, it may only be necessary to examine the address of that device at the more frequent rate. The address of the other device (645) that remained connected after the error was detected need only be examined during the one time that it appears in the normal sequential order.

The selection of an appropriate frequency at which to examine the addresses of the previously connected devices is primarily a function of two factors, examination overhead and minimum time to redetect a device. As the frequency is decreased, e.g. to once every tenth time, fewer total examinations are made and thus there is less "overhead", or required processor time, to examine all valid addresses. However, the average time that it takes to detect the device once it has returned to the bus will be proportionately increased. Thus the optimum frequency will be determined by taking into account the relative significance of each of these two factors. In a system having about 45–50 valid addresses, examination of the previously connected addresses every fifth time in the sequence has been found to decrease the average time to redetect a device by about 90% without significantly increasing overhead. In general, the previously connected devices are examined at every Nth position in the sequence where N is a percentage of the total number M of valid addresses. Preferably, this percentage is in the range of 10%–20%.

Figure 3:
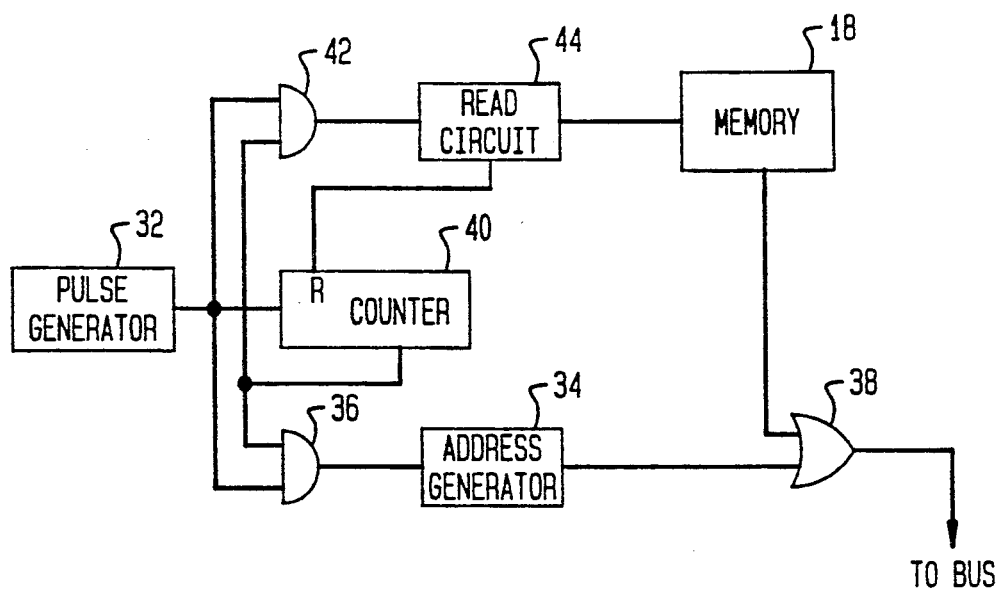
FIG. 3 is a block diagram of a hardware embodiment for implementing the detecting system of the present invention.

The above-described procedure for detecting a device with whom connection has been lost can be implemented by means of software, as exemplified by the flow chart of FIG. 2. Alternatively, the addressing can be controlled by means of a hardware embodiment of the invention. One example of such an embodiment is illustrated in FIG. 3.

A pulse generator 32 can be activated in response to the sensing of an error condition, i.e. loss of connection. Its output pulses are applied to an address generator 34 by means of a normally enabled AND gate 36. In response to each pulse, the address generator is incremented by one step and produces an address signal. This address is applied to the bus (possibly via the master controller) by means of an OR gate 38.

The output pulses are also counted in a counter 40. When the counter detects the number of pulses N related to the desired frequency at which the previously connected devices are to be addressed, it produces an output signal. This signal disables the AND gate 36 and enables a second AND gate 42. The AND gate 42 then allows pulses from the pulse generator 32 to be passed along to a read control circuit 44. In response to the pulses, the read circuit causes the addresses stored in the memory 18 to be read out and applied to the bus by means of the OR gate 38.

After the last address has been read out of the memory 18, the read control circuit can send a reset signal to the counter 40. As a result, the AND gate 36 is once again enabled and the address generator resumes from where the sequence was interrupted.

It will be appreciated by those of ordinary skill in the art that the present invention can be embodied in other specific forms without departing from the spirit or essential characteristics thereof. For example, the searching of addresses to detect devices that are connected to the bus need not be limited to the situation in which a loss of connection is sensed. In some systems it is desirable to examine the addresses if communication has not occurred for a preset period of time, regardless of whether an error is detected. The present invention is applicable to such a situation as well.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. In a data transmission system in which a master controller communicates with one or more slave devices by means of a data bus and in which the master controller detects the presence of a device on the bus by requesting responses from device addresses on the bus and stores the address of each responding slave device in a memory, a method for subsequently examining the addresses on the bus to reestablish communication with a slave device that was previously present on the bus, comprising the steps of:
   detecting a condition which requires an assessment of slave devices connected to the bus; and
   polling the device addresses on the bus in response to said condition and in a manner such that the address stored in the memory of at least one slave device that was detected as previously being present on the bus is examined for the presence of a device more frequently than addresses which are not stored in said memory.

2. The method of claim 1 wherein all of the addresses stored in said memory are examined more frequently than addresses which are not stored in said memory.

3. The method of claim 1 wherein said polling step is carried out in response to a detection that communication has been interrupted between the master controller and at least one of the slave devices.

4. The method of claim 1 wherein said polling step comprises the steps of interrogating each address in sequence and interrupting the sequence after every Nth interrogation to interrogate the address of said one device, wherein N is an integer less than the total number of addresses on the bus.

5. The method of claim 4 wherein N lies in the range of 10%–20% of the total number of address.

6. The method of claim 4 wherein all of the addresses stored in said memory are interrogated during each interruption of the sequence.

7. The method of claim 3 further including the steps of detecting that communication has been reestablished between the master controller and said one slave device, and terminating said polling step in response to the reestablishment of communication with said one slave device.

8. In a data transmission system in which a master controller communicates, by means of a data bus, with one or more slave devices at respective addresses on the data bus, a method for establishing communication with a slave device present on the bus, comprising the steps of:
   detecting new slave devices on the bus by requesting responses from bus addresses at the master controller;
   storing in a memory the addresses of new slave devices that are detected on the bus by the master controller;
   detecting the existence of a condition which indicates the possible loss of communication with a slave device whose address is stored in said memory; and
   examining bus addresses in response to the detection of said condition and in a manner such that responses are requested from addresses of slave devices previously present on the bus more frequently than addresses which are not stored in the memory, to thereby reestablish communication with said slave devices.

9. A data communication system, comprising:
   a master controller having a communication bus connected thereto;
   means for serially transmitting on said bus addresses associated with devices that can be connected to said bus for communication with said controller;
   means for detecting if a device responds to an address transmitted on said bus;
   a memory unit responsive to said detecting means for storing an indication of the addresses of devices that are connected to the bus;

means for sensing a condition requiring an assessment of the devices that are present on the bus; and means responsive to said sensing means for examining addresses in a sequence such that the address associated with a device that was previously detected as being present on the bus is examined more frequently than addresses that are not indicated in said memory unit.

10. The data communication system of claim 9 wherein said transmitting means includes an address generator that is sequentially incremented and said examining means includes a counter that is responsive to the incrementing of said generator to cause a more frequently examined address to be retrieved from said memory unit and inserted into the sequence of generated addresses each time said generator is incremented a predetermined number of times.

11. A method of searching for slave devices that are connected to a master controller by means of a communication link, comprising the steps of:

serially transmitting addresses respectively associated with possible slave devices that can be validly connected to the master controller;

detecting and storing the identity of each slave device that responds to the transmitted addresses;

sensing a lack of communication between the master controller and at least one of the devices whose address is stored;

transmitting the possible addresses in a sequence wherein the address of the device with whom communication was lacking is transmitted at a more frequent rate than addresses which are not associated with the stored identities; and detecting whether any devices respond to the addresses transmitted during said second transmitting step.

12. The method of claim 11 wherein the addresses of all of the identified devices are transmitted at said more frequent rate.

13. The method of claim 11 wherein the sequence of addresses transmitted during said second transmitting step comprises a string having all valid addresses in sequential order and having said more frequently transmitted address occurring at every Nth position in said string, wherein N is an integer less than the total number of valid addresses.

14. The method of claim 13 wherein N lies in the range of 10%-20% of the total number of valid addresses.

15. In a video recorder network in which an edit controller communicates with one or more slave recorders by means of a data bus, a method for establishing communication with a slave recorder present on the bus, comprising the steps of:

detecting the presence of a slave recorder on the bus by requesting responses from valid bus addresses at the edit controller;

storing in a memory the address of the slave recorder that is detected on the bus by the edit controller;

sensing a condition indicating the possible loss of communication with the slave device that was present on the bus; and subsequently polling valid addresses in response to the sensing of said condition and in a manner such that a response is requested more frequently from the address of the slave recorder that was previously present on the bus than address which are not stored in the memory, to thereby reestablish communication with said slave recorder.

16. The method of claim 15 wherein said polling step is carried out in response to a detection that communication has been interrupted between the edit controller and said slave recorder.

17. The method of claim 16 further including the steps of detecting that communication has been reestablished between the edit controller and said slave recorder, and terminating said polling step in response to the reestablishment of communication with said slave recorder.

18. A video recorder network, comprising:

a master recording controller having a communication bus connected thereto;

means for transmitting on said bus valid addresses associated with slave recorders that can be connected to said bus for communication with said controller;

means for detecting a slave recorder that responds to an address transmitted on said bus;

a memory unit responsive to said detecting means for storing an indication of the detected slave recorder;

means for sensing a condition requiring an assessment of whether the slave recorder is present on the bus; and means responsive to said sensing means for examining said valid addresses in a sequence such that the address associated with said detected slave recorder is examined more frequently than other valid addresses.

19. The network of claim 18 wherein said addresses are examined in a sequence comprising a string having all valid addresses in sequential order and having the address of said detected recorder occurring at every Nth position in said string, where N is an integer less than the total number of valid addresses.

20. The network of claim 19 wherein N lies in the range of 10%-20% of the total number of valid addresses.

* * * * *